(12) United States Patent
Binek et al.

(10) Patent No.: US 12,546,227 B2
(45) Date of Patent: Feb. 10, 2026

(54) COOLING NOZZLE VANES OF A TURBINE ENGINE

(71) Applicant: RTX Corporation, Farmington, CT (US)

(72) Inventors: Lawrence A. Binek, Glastonbury, CT (US); Paul M. Lutjen, Kennebunkport, ME (US); Jose R. Paulino, Jupiter, FL (US); Robert B. Fowler, West Palm Beach, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/438,265

(22) Filed: Feb. 9, 2024

(65) Prior Publication Data

US 2025/0257665 A1    Aug. 14, 2025

(51) Int. Cl.

| F01D 9/04 | (2006.01) |
|---|---|
| F01D 5/18 | (2006.01) |
| F15B 21/04 | (2019.01) |
| F15B 21/0423 | (2019.01) |
| F15B 21/0427 | (2019.01) |
| F23R 3/00 | (2006.01) |
| F23R 3/50 | (2006.01) |

(52) U.S. Cl.
CPC ............. *F01D 9/041* (2013.01); *F01D 5/187* (2013.01); *F15B 21/04* (2013.01); *F15B 21/0423* (2019.01); *F15B 21/0427* (2019.01); *F23R 3/002* (2013.01); *F23R 3/50* (2013.01); *F05D 2240/35* (2013.01); *F05D 2240/81* (2013.01); *F23R 2900/00018* (2013.01)

(58) Field of Classification Search
CPC .......... F01D 9/041; F01D 5/187; F15B 21/04; F15B 21/0423; F15B 21/0427; F23R 3/002; F23R 3/50; F23R 2900/00018; F05D 2240/35; F05D 2240/81
See application file for complete search history.

(56) References Cited

U.S. PATENT DOCUMENTS

| 3,691,766 A | 9/1972 | Champion |
|---|---|---|
| 4,171,614 A | 10/1979 | Weiler |
| 4,339,925 A | 7/1982 | Eggmann |
| 4,439,982 A | 4/1984 | Weiler |

(Continued)

OTHER PUBLICATIONS

EP search report for EP25156954.7 dated Jul. 14, 2025.

*Primary Examiner* — Brian Christopher Delrue
(74) *Attorney, Agent, or Firm* — Getz Balich LLC

(57) ABSTRACT

An assembly for a turbine engine includes a nozzle structure, a septum and a plurality of cooling vanes. The nozzle structure includes a first platform, a second platform and a plurality of nozzle vanes arranged circumferentially about an axis. The septum axially and circumferentially overlaps the first platform with a cooling cavity formed by and radially between the septum and the first platform. The septum includes a plurality of cooling apertures aligned with the nozzle vanes. Each of the cooling apertures extends radially through the septum to the cooling cavity. The cooling cavity includes a cavity outlet fluidly coupled to a flowpath. The cooling vanes are arranged circumferentially about the axis and project from the first platform into the cooling cavity. The cooling vanes are located between the cooling apertures and the cavity outlet along the cooling cavity.

17 Claims, 7 Drawing Sheets

(56) References Cited

U.S. PATENT DOCUMENTS

| | | | | |
|---|---|---|---|---|
| 5,033,263 | A | 7/1991 | Shekleton | |
| 6,382,906 | B1 | 5/2002 | Brassfield | |
| 10,598,379 | B2 * | 3/2020 | Cunha | F23R 3/005 |
| 11,248,789 | B2 * | 2/2022 | Binek | F02C 3/14 |
| 11,466,593 | B2 * | 10/2022 | Binek | F02C 3/145 |
| 11,612,938 | B2 * | 3/2023 | Binek | F01D 9/041 |
| | | | | 60/752 |
| 11,753,952 | B2 * | 9/2023 | Binek | B22F 10/40 |
| | | | | 60/752 |
| 12,007,117 | B1 * | 6/2024 | Boardman | F02C 7/22 |
| 12,013,120 | B1 * | 6/2024 | Binek | F02C 3/145 |
| 2014/0366544 | A1 | 12/2014 | Maccaul | |
| 2017/0138599 | A1 * | 5/2017 | Baibuzenko | F01D 25/12 |
| 2018/0298774 | A1 | 10/2018 | Carlson | |
| 2019/0234236 | A1 | 8/2019 | Spangler | |
| 2020/0362724 | A1 * | 11/2020 | Binek | F23R 3/54 |
| 2021/0102704 | A1 * | 4/2021 | Binek | B22F 10/40 |
| 2022/0316408 | A1 * | 10/2022 | Binek | F01D 9/02 |

* cited by examiner

COOLING NOZZLE VANES OF A TURBINE ENGINE

BACKGROUND OF THE DISCLOSURE

1. Technical Field

This disclosure relates generally to a turbine engine and, more particularly, to a stationary structure for the turbine engine.

2. Background Information

A gas turbine engine includes a stationary engine structure for housing and/or supporting internal rotating components of the gas turbine engine. Various stationary engine structures are known in the art. While these known stationary engine structures have various benefits, there is still room in the art for improvement.

SUMMARY OF THE DISCLOSURE

According to an aspect of the present disclosure, an assembly is provided for a turbine engine. This assembly includes a nozzle structure, a septum and a plurality of cooling vanes. The nozzle structure includes a first platform, a second platform and a plurality of nozzle vanes arranged circumferentially about an axis. The first platform forms a first boundary of a flowpath through the nozzle structure. The second platform forms a second boundary of the flowpath. The nozzle vanes extend radially across the flowpath from the first platform to the second platform. The septum axially and circumferentially overlaps the first platform with a cooling cavity formed by and radially between the septum and the first platform. The septum includes a plurality of cooling apertures aligned with the nozzle vanes. Each of the cooling apertures extends radially through the septum to the cooling cavity. The cooling cavity includes a cavity outlet fluidly coupled to the flowpath. The cooling vanes are arranged circumferentially about the axis and project from the first platform into the cooling cavity. The cooling vanes are located between the cooling apertures and the cavity outlet along the cooling cavity.

According to another aspect of the present disclosure, another assembly is provided for a turbine engine. This assembly includes a combustor, a nozzle structure, a septum and a baffle. The combustor is arranged in a plenum and includes a combustion chamber. The nozzle structure is arranged at an outlet from the combustion chamber. The nozzle structure includes a first platform, a second platform and a plurality of nozzle vanes arranged circumferentially about an axis. The nozzle vanes extend radially across a flowpath from the first platform to the second platform. The septum extends axially and circumferentially along the first platform with a cooling cavity formed by and radially between the septum and the first platform. The septum includes a plurality of cooling apertures aligned with the nozzle vanes. Each of the cooling apertures extends radially through the septum from a feed cavity to the cooling cavity. The baffle extends axially and circumferentially along the septum with the feed cavity formed by and radially between the baffle and the septum. The baffle includes a plurality of ports extending radially through the baffle from the plenum to the feed cavity.

According to still another aspect of the present disclosure, another assembly is provided for a turbine engine. This assembly includes a combustor, a nozzle structure and a septum. The combustor is arranged in a plenum and includes a combustion chamber. The nozzle structure is arranged at an outlet from the combustion chamber. The nozzle structure includes a first platform, a second platform and a plurality of nozzle vanes arranged circumferentially about an axis. The nozzle vanes extend radially across a flowpath from the first platform to the second platform. The nozzle vanes include a first nozzle vane. The first nozzle vane extends longitudinally between a leading edge and a trailing edge. The septum extends axially and circumferentially along the first platform with a cooling cavity formed by and radially between the septum and the first platform. The septum includes a plurality of cooling apertures extending radially through the septum from a feed cavity to the cooling cavity. A first set of the cooling apertures are axially and circumferentially aligned with the first nozzle vane. A density of cooling apertures in the first set of the cooling apertures is greater in an area aligned with the trailing edge than in an area aligned with the leading edge.

The assembly may also include a plurality of cooling elements connected to the first platform and projecting partially into the cooling cavity.

The assembly may also include a turbine wall and an intermediate structure. The

The turbine wall may axially and circumferentially overlap the combustor. The intermediate structure may extend between a downstream end of the first platform and an upstream end of the turbine wall. The septum and the baffle may each extend axially to the intermediate structure.

The cavity outlet may be located upstream of the first platform along the flowpath.

Each of the cooling apertures may be configured to direct a stream of air across the cooling cavity against the first platform.

The cooling apertures may be axially aligned along the axis and arranged circumferentially about the axis in an annular array.

The cooling apertures may be equispaced circumferentially about the axis in the annular array.

The nozzle vanes may include a first nozzle vane. The cooling apertures may include a first cooling aperture. The first cooling aperture may be axially and circumferentially aligned with the first nozzle vane.

The nozzle vanes may include a first nozzle vane and a second nozzle vane that circumferentially neighbors the first nozzle vane with a channel formed by and extending circumferentially between the first nozzle vane and the second nozzle vane. A first set of the cooling apertures may be axially and circumferentially aligned with the first nozzle vane. A second set of the cooling apertures may be axially and circumferentially aligned with the second nozzle vane. A section of the septum may be non-perforated. The section of the septum may extend circumferentially between the first set of the cooling apertures and the second set of the cooling apertures. The section of septum may axially overlap at least a major portion of the channel.

The nozzle vanes may include a first nozzle vane. The first nozzle vane may extend longitudinally between a leading edge and a trailing edge. A first set of the cooling apertures may be axially and circumferentially aligned with the first nozzle vane. A density of cooling apertures in the first set of the cooling apertures may be greater in an area aligned with the trailing edge than in an area aligned with the leading edge.

The cooling vanes may include a first cooling vane. The first cooling vane may project radially and/or axially from the first platform to an unsupported distal end of the first cooling vane.

The cooling vanes may be axially offset from the nozzle vanes.

The cooling vanes may include a first cooling vane. The first cooling vane may be configured as or otherwise include a cambered cooling vane.

The nozzle vanes may be configured to swirl combustion products in a circumferential direction about the axis. The cooling vanes may be configured to swirl air in the circumferential direction about the axis.

The assembly may also include a baffle axially and circumferentially overlapping the septum with a feed cavity formed by and radially between the baffle and the septum. The septum may be radially between the baffle and the first platform with the cooling apertures fluidly coupling the feed cavity to the cooling cavity.

The assembly may also include a turbine wall and an intermediate structure. The intermediate structure may extend between a downstream end of the first platform and an upstream end of the turbine wall. The septum may extend axially to the intermediate structure. The baffle may extend axially to the intermediate structure with one or more ports formed through the baffle adjacent the intermediate structure.

The assembly may also include a combustor wall radially between and bordering a plenum and a combustion chamber. A downstream end of the combustor wall may be axially spaced from an upstream end of the first platform to form the cavity outlet.

The assembly may also include a combustor disposed in a plenum and including a combustion chamber. The nozzle structure may be arranged at an outlet from the combustion chamber. The cooling aperture may be configured to receive air from the plenum to direct across the cooling cavity onto the first platform.

The assembly may also include a monolithic body that includes the nozzle structure, the septum and the cooling vanes.

The first platform may be an inner platform which circumscribes the septum and the cooling vanes. The second platform may be an outer platform which circumscribes the inner platform.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
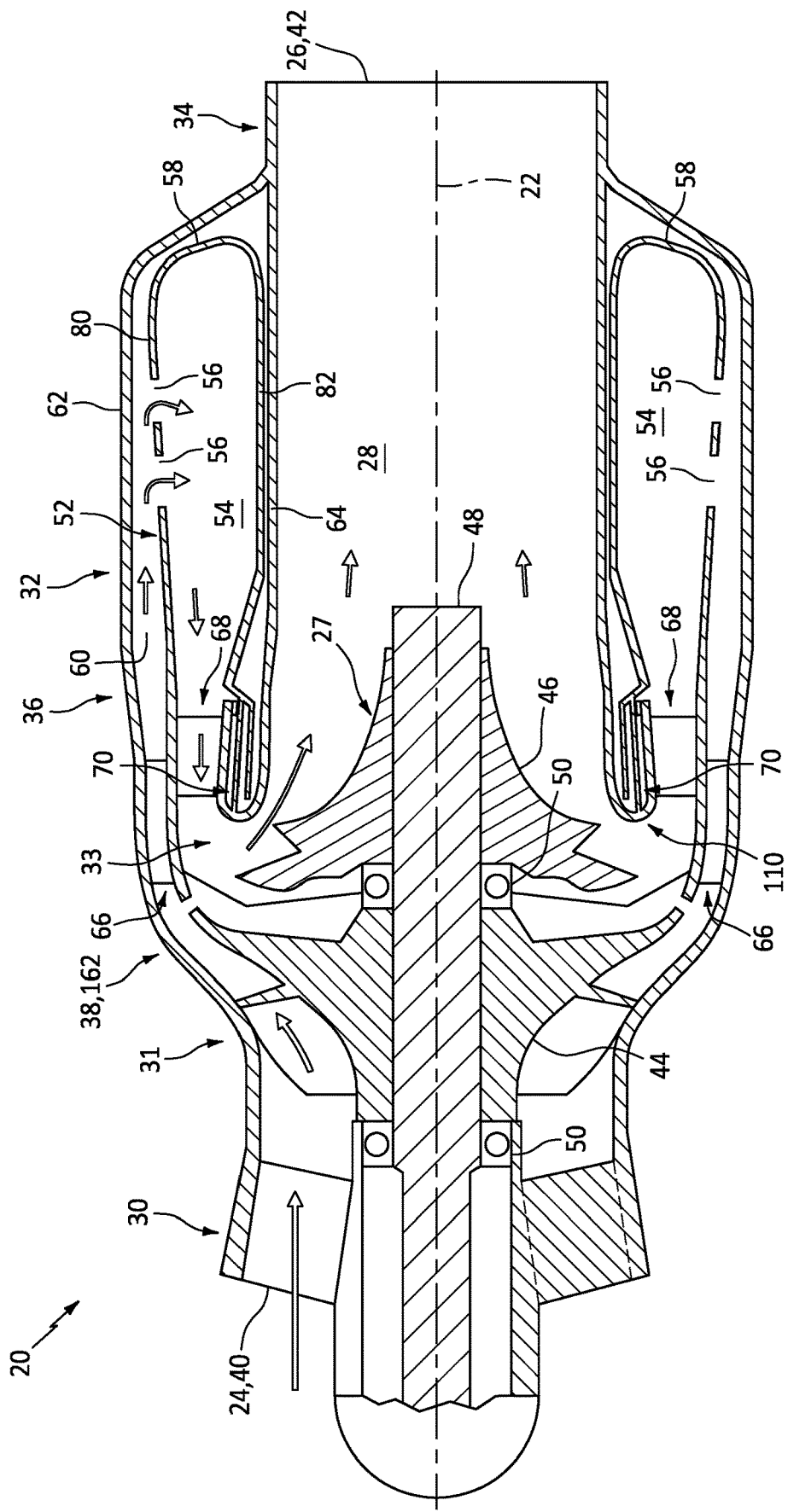
FIG. 1 is a schematic side sectional illustration of a turbine engine.

FIG. 1 is a side sectional illustration of a turbine engine 20. The turbine engine 20 of FIG. 1 is configured as a single spool, radial-flow turbojet gas turbine engine. This turbine engine 20 is configured for propelling an aircraft such as, but not limited to, an airplane, a drone (e.g., an unmanned aerial vehicle (UAV)), a spacecraft or any other manned or unmanned aerial vehicle or system. The present disclosure, however, is not limited to such an exemplary turbojet turbine engine configuration nor to an aircraft propulsion system application. For example, the turbine engine 20 may alternatively be configured as an auxiliary power unit (APU) for the aircraft, or an industrial gas turbine engine.

The turbine engine 20 of FIG. 1 extends axially along an axis 22 from a forward, upstream airflow inlet 24 into the turbine engine 20 to an aft, downstream combustion products exhaust 26 from the turbine engine 20. The axis 22 may be a centerline axis of the turbine engine 20 and/or a centerline axis of various components within the turbine engine 20. The axis 22 may also or alternatively be a rotational axis for various components within the turbine engine 20; e.g., an engine rotating assembly 27.

The turbine engine 20 includes a core flowpath 28, an inlet section 30, a compressor section 31, a (e.g., reverse flow) combustor section 32, a turbine section 33 and an exhaust section 34. At least (or only) the compressor section 31, the combustor section 32 and the turbine section 33 may form a core 36 of the turbine engine 20. The turbine engine 20 also includes a stationary structure 38. Briefly, this stationary structure 38 may house and/or form the engine sections 31-33. The stationary structure 38 may also form the engine sections 30 and 34.

The core flowpath 28 extends within the turbine engine 20 and its engine core 36 from an airflow inlet 40 into the core flowpath 28 to a combustion products exhaust 42 from the core flowpath 28. More particularly, the core flowpath 28 of FIG. 1 extends sequentially through the inlet section 30, the compressor section 31, the combustor section 32, the turbine section 33 and the exhaust section 34 between the core inlet 40 and the core exhaust 42. The core inlet 40 of FIG. 1 forms the engine inlet 24 into the turbine engine 20. The core exhaust 42 of FIG. 1 forms the engine exhaust 26 from the turbine engine 20. However, the core inlet 40 may alternatively be discrete and downstream from the engine inlet 24 and/or the core exhaust 42 may alternatively be discrete and upstream from the engine exhaust 26.

The compressor section 31 includes a bladed compressor rotor 44. The turbine section 33 includes a bladed turbine rotor 46. Each of these engine rotors 44, 46 includes a rotor base (e.g., a hub or a disk) and a plurality of rotor blades (e.g., vanes or airfoils) arranged circumferentially around and connected to the rotor base. The rotor blades, for example, may be formed integral with or mechanically fastened, welded, brazed and/or otherwise attached to the respective rotor base.

The compressor rotor 44 may be configured as a radial flow compressor rotor (e.g., an axial inflow-radial outflow compressor rotor), and the compressor section 31 may be configured as a radial flow compressor section. The turbine rotor 46 may be configured as a radial flow turbine rotor (e.g., a radial inflow-axial outflow turbine rotor), and the turbine section 33 may be configured as a radial flow turbine section. The compressor rotor 44 is connected to the turbine rotor 46 through an engine shaft 48. At least (or only) the compressor rotor 44, the turbine rotor 46 and the engine shaft 48 collectively form the engine rotating assembly 27. This engine rotating assembly 27 and its engine shaft 48 are rotatably supported by the stationary structure 38 through a plurality of bearings 50; e.g., rolling element bearings, journal bearings, etc.

The combustor section 32 includes an annular combustor 52 with an annular combustion chamber 54. The combustor 52 of FIG. 1 is configured as a reverse flow combustor. Inlet ports 56 and/or flow tubes into the combustion chamber 54, for example, may be arranged at (e.g., on, adjacent or proximate) and/or towards an aft bulkhead wall 58 of the combustor 52. An outlet from the combustor 52 may be arranged axially aft of an inlet to the turbine section 33. The combustor 52 may also be arranged radially outboard of and/or axially overlap at least a (e.g., aft) portion of the turbine section 33. With this arrangement, the core flowpath 28 of FIG. 1 reverses direction (e.g., from a forward-to-aft direction to an aft-to-forward direction) a first time as the core flowpath 28 extends from an annular diffuser plenum 60 surrounding the combustor 52 into the combustion chamber 54. The core flowpath 28 of FIG. 1 then reverses direction (e.g., from the aft-to-forward direction to the forward-to-aft direction) a second time as the core flowpath 28 extends from the combustion chamber 54 into the turbine section 33.

During turbine engine operation, air enters the turbine engine 20 through the inlet section 30 and its core inlet 40. The inlet section 30 directs the air from the core inlet 40 into the core flowpath 28 and the compressor section 31. The air entering the core flowpath 28 may be referred to as "core air". This core air is compressed by the compressor rotor 44. The compressed core air is directed through a diffuser and its diffuser plenum 60 into the combustion chamber 54. Fuel is injected and mixed with the compressed core air to provide a fuel-air mixture. This fuel-air mixture is ignited within the combustion chamber 54, and combustion products thereof flow through the turbine section 33 and drive rotation of the turbine rotor 46 about the axis 22. The rotation of the turbine rotor 46 drives rotation of the compressor rotor 44 about the axis 22 and, thus, compression of the air received from the core inlet 40. The exhaust section 34 directs the combustion products out of the turbine engine 20 into an environment external to the aircraft to provide forward engine thrust.

Figure 2:
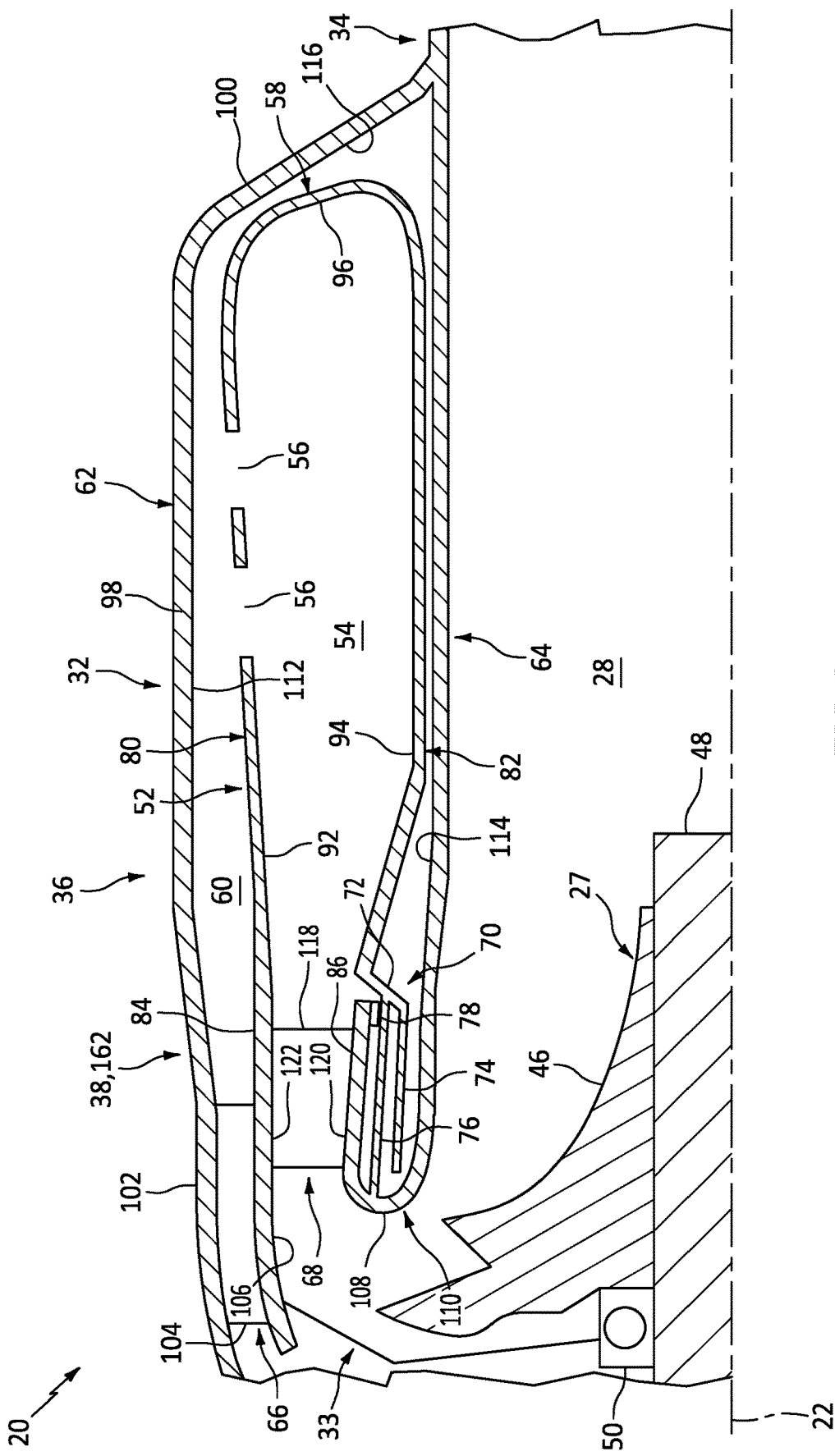
FIG. 2 is a schematic side sectional illustration of a portion of the turbine engine at a combustor.
Figure 3:
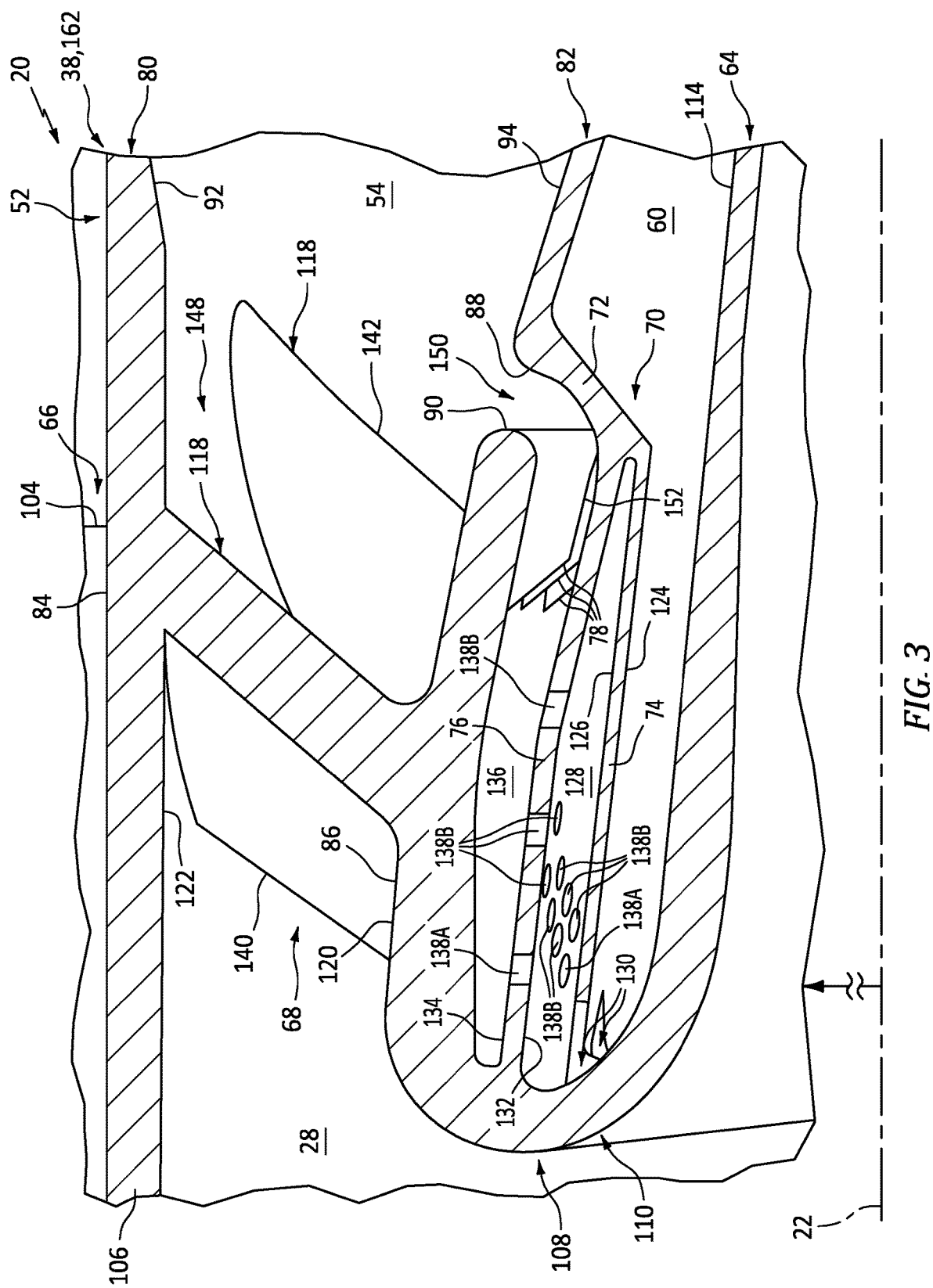
FIG. 3 is a perspective cutaway illustration of a portion of the turbine engine at a turbine nozzle and a cooling structure.

Referring to FIG. 2, the stationary structure 38 includes the combustor 52 and one or more engine walls 62 and 64 (e.g., cases) forming the diffuser plenum 60 along the combustor 52. The stationary structure 38 of FIG. 2 also includes a diffuser nozzle 66, a turbine nozzle 68 and a cooling structure 70. Referring to FIG. 3, the cooling structure 70 includes an endwall 72, a baffle 74, a septum 76 and one or more cooling vanes 78 (or other cooling elements).

The combustor 52 of FIG. 2 includes a radial outer combustor wall 80, a radial inner combustor wall 82 and the bulkhead wall 58. The combustor 52 and each of its combustor walls 58, 80 and 82 extends circumferentially about (e.g., completely around) the axis 22. The combustor 52 and each of its combustor walls 80 and 82 may thereby have a full-hoop (e.g., tubular) geometry, and the bulkhead wall 58 may have a full-hoop (e.g., annular, frustoconical, etc.) geometry.

The outer combustor wall 80 is arranged axially between the bulkhead wall 58 and the turbine nozzle 68. The outer combustor wall 80 of FIG. 2, for example, projects axially along the axis 22 (e.g., in the forward direction) out from the bulkhead wall 58 to a radial outer platform 84 of the turbine nozzle 68. The outer combustor wall 80 of FIG. 2 is connected to (e.g., formed integral with) the bulkhead wall 58 at a radial outer end of the bulkhead wall 58. The outer combustor wall 80 of FIG. 2 is also connected to (e.g., formed integral with) the turbine nozzle outer platform 84 at an upstream, aft end of the turbine nozzle outer platform 84.

The inner combustor wall 82 is arranged axially between the bulkhead wall 58 and the turbine nozzle 68. The inner combustor wall 82 of FIG. 2, for example, projects axially along the axis 22 (e.g., in the forward direction) out from the bulkhead wall 58 towards a radial inner platform 86 of the turbine nozzle 68. More particularly, referring to FIG. 3, the inner combustor wall 82 extends axially along the axis 22 to a forward, downstream end 88 of the inner combustor wall 82, where the inner combustor wall downstream end 88 is axially next to and (e.g., slightly) spaced from an aft, upstream end 90 of the turbine nozzle inner platform 86. The inner combustor wall 82 of FIG. 2 is connected to (e.g., formed integral with) the bulkhead wall 58 at a radial inner end of the bulkhead wall 58.

The bulkhead wall 58 is arranged radially between the outer combustor wall 80 and the inner combustor wall 82. The bulkhead wall 58 of FIG. 2, for example, projects radially (e.g., outward away from the axis 22) out from the inner combustor wall 82 to the outer combustor wall 80. The bulkhead wall 58 of FIG. 2 is connected to the outer combustor wall 80 at an aft end of the outer combustor wall 80. The bulkhead wall 58 of FIG. 2 is connected to the inner combustor wall 82 at an aft, upstream end of the inner combustor wall 82.

The combustor walls 58, 80 and 82 collectively form the combustion chamber 54 of FIG. 2 within the combustor 52. An interior surface 92 (e.g., a tubular radial inner surface) of the outer combustor wall 80 borders (e.g., lines) the combustion chamber 54 and, more particularly, forms a radial outer peripheral boundary of the combustion chamber 54. An interior surface 94 (e.g., a tubular radial outer surface) of the inner combustor wall 82 borders the combustion chamber 54 and, more particularly, forms a radial inner peripheral boundary of the combustion chamber 54. An interior surface 96 (e.g., an annular forward surface) of the bulkhead wall 58 borders the combustion chamber 54 and, more particularly, forms a side peripheral boundary of the combustion chamber 54. The combustion chamber 54 thereby extends radially within the combustor 52 between the inner combustor wall 82 and its interior surface 94 and the outer combustor wall 80 and its interior surface 92. The combustion chamber 54 projects axially into the combustor 52 from the outlet of the combustion chamber 54 (e.g., at the turbine nozzle 68) to the bulkhead wall 58 and its interior surface 96.

The diffuser wall 62 is spaced radially outboard from the combustor 52 and the turbine nozzle 68. The diffuser wall 62 extends axially along the axis 22, and axially overlaps the combustor 52 and its outer combustor wall 80. The diffuser wall 62 may also axially overlap the turbine nozzle 68 and its turbine nozzle outer platform 84. The diffuser wall 62 of FIG. 2, for example, includes a diffuser sidewall 98 and a diffuser endwall 100. The diffuser sidewall 98 projects axially (e.g., in the forward direction) out from the diffuser endwall 100, axially along the outer combustor wall 80 and the turbine nozzle outer platform 84, to the diffuser nozzle 66. This diffuser sidewall 98 of FIG. 2 is connected to (e.g., formed integral with) the diffuser endwall 100 at a radial outer end of the diffuser endwall 100. The diffuser sidewall 98 of FIG. 2 is also connected to (e.g., formed integral with) a radial outer platform 102 of the diffuser nozzle 66 at a downstream, aft end of the turbine nozzle outer platform 84. The diffuser endwall 100 projects radially (e.g., outward away from the axis 22) out from the turbine wall 64, along the bulkhead wall 58, to the diffuser sidewall 98. This diffuser endwall 100 of FIG. 2 is connected to (e.g., formed integral with) the diffuser sidewall 98 at a downstream, aft end of the diffuser sidewall 98, and to the turbine wall 64. The diffuser wall 62 and its members 98 and 100 extend circumferentially about (e.g., completely around) the axis 22. The diffuser wall 62 and its members 98 and 100 may thereby circumscribe the combustor 52 and/or the turbine wall 64.

The diffuser nozzle 66 is a vane array structure. This diffuser nozzle 66 is configured to condition the core air leaving the compressor section 31 (see FIG. 1) and entering the diffuser plenum 60. The diffuser nozzle 66 of FIG. 2, for example, includes one or more diffuser vanes 104 (e.g., guide vanes) configured to impart swirl to the core air. These diffuser vanes 104 are arranged (e.g., equispaced) circumferentially about the axis 22 in an annular diffuser vane array. Each of the diffuser vanes 104 extends radially across the core flowpath 28. Each of the diffuser vanes 104 of FIG. 2, for example, extends radially between and is connected to (e.g., formed integral with) the diffuser nozzle outer platform 102 and a radial inner platform 106 of the diffuser nozzle 66. Here, the diffuser nozzle inner platform 106 may be partially (or completely) formed by the turbine nozzle 68 and its turbine nozzle outer platform 84. However, in other embodiments, the diffuser nozzle inner platform 106 and the turbine nozzle outer platform 84 may be discrete from one another; e.g., axially offset from one another.

The turbine wall 64 is spaced radially outboard of the turbine rotor 46. The turbine wall 64 extends axially along the axis 22, and axially overlaps at least a downstream, aft portion of the turbine rotor 46. The turbine wall 64 extends circumferentially about (e.g., completely around) the axis 22, and circumscribes at least the aft portion of the turbine rotor 46. The turbine wall 64 thereby houses at least the aft portion of the turbine rotor 46. The turbine wall 64 also forms a radial outer peripheral boundary of the core flowpath 28 across at least the aft portion of the turbine rotor 46.

The turbine wall 64 of FIG. 2 is spaced radially inboard from the combustor 52 and the turbine nozzle 68. The turbine wall 64 may be connected to the turbine nozzle inner platform 86 by an (e.g., annular) intermediate structure 108. This intermediate structure 108 may have a curved and/or folded-over geometry (e.g., a substantially U-shaped geometry, a semi-circular geometry, etc.) which extends from a forward, upstream end of the turbine wall 64 to a forward, downstream end of the turbine nozzle inner platform 86. With this arrangement, at least (or only) the turbine wall 64, the turbine nozzle inner platform 86 and the intermediate structure 108 may collectively form a flowpath wall structure 110 that forms a peripheral boundary of the core flowpath 28 in the turbine section 33. This flowpath wall structure 110 of FIG. 2 wraps around one or more members of the cooling structure 70; e.g., the structure baffle 74 and the structure septum 76.

The engine walls 58, 62, 64, 80 and 82 collectively form the diffuser plenum 60 of FIG. 2 around the combustor 52. A (e.g., tubular) radial inner surface 112 of the diffuser sidewall 98 forms a radial outer peripheral boundary of the diffuser plenum 60 radially outboard of the combustor 52 and its outer combustor wall 80. A (e.g., tubular) radial outer surface 114 of the turbine wall 64 forms a radial inner peripheral boundary of the diffuser plenum 60 radially inboard of the combustor 52 and its inner combustor wall 82. An (e.g., annular) axial side surface 116 of the diffuser endwall 100 forms a side peripheral boundary of the diffuser plenum 60 axially to a side of the combustor 52 and its bulkhead wall 58. With this arrangement, a radial outer portion of the diffuser plenum 60 extends radially between, is formed by and thereby is bordered by the diffuser wall 62 and the outer combustor wall 80. A radial inner portion of the diffuser plenum 60 extends radially between, is formed by and thereby is bordered by (a) the turbine wall 64 and (b) the inner combustor wall 82, the structure endwall 72 and the structure baffle 74. An axial end portion of the diffuser plenum 60 extends axially between, is formed by and thereby is bordered by the diffuser endwall 100 and the bulkhead wall 58. The diffuser plenum 60 may thereby extend axially along each combustor wall 80, 82 and radially along the bulkhead wall 58. With this arrangement, the diffuser plenum 60 may wrap around the combustor 52 from or about the diffuser nozzle 66 to the intermediate structure 108.

The turbine nozzle 68 is a vane array structure. This turbine nozzle 68 is configured to condition the combustion products exiting the combustor 52 and its combustion chamber 54. The turbine nozzle 68 of FIG. 2, for example, includes one or more turbine vanes 118 (e.g., guide vanes) configured to impart swirl to the combustion products. These turbine vanes 118 are arranged (e.g., and equispaced) circumferentially about the axis 22 in a turbine vane array. Each of the turbine vanes 118 extends radially across the core flowpath 28. Each of the turbine vanes 118 of FIG. 2, for example, extends radially between and is connected to (e.g., formed integral with) the turbine nozzle outer platform 84 and the turbine nozzle inner platform 86. Here, a radial outer surface 120 of the turbine nozzle inner platform 86 forms a radial inner peripheral boundary of the core flowpath 28 (e.g., axially) through the turbine nozzle 68. A radial inner surface 122 of the turbine nozzle outer platform 84 forms a radial outer peripheral boundary of the core flowpath 28 through the turbine nozzle 68 which is radially opposite the inner peripheral boundary formed by the turbine nozzle inner platform 86.

Referring to FIG. 3, the structure endwall 72 is connected to (e.g., formed integral with) the inner combustor wall 82 at the inner combustor wall downstream end 88. The structure endwall 72 of FIG. 3 projects radially inward from and may project axially forward from the inner combustor wall 82 to an aft end of the structure baffle 74. The structure endwall 72 extends circumferentially about (e.g., completely around) the axis 22 providing the structure endwall 72 with, for example, a full-hoop (e.g., annular) geometry.

The structure baffle 74 is located radially between and is radially spaced from the turbine wall 64 and the structure septum 76. The structure baffle 74 is connected to (e.g., formed integral with) and axially between the structure endwall 72 and the intermediate structure 108. The structure baffle 74 of FIG. 3, for example, extends axially forward from and may extend radially outward from a radial inner end of the structure endwall 72 to the intermediate structure 108. The structure baffle 74 extends circumferentially about (e.g., completely around) the axis 22 providing the structure baffle 74 with, for example, a full-hoop (e.g., tubular) geometry. With this configuration, the structure baffle 74 may axially and circumferentially overlap the turbine nozzle inner platform 86 and an upstream portion of the turbine wall 64. A (e.g., tubular) radial inner surface 124 of the structure baffle 74 borders the diffuser plenum 60. More particularly, the baffle inner surface 124 forms a radial outer peripheral boundary of the inner portion of the diffuser plenum 60 axially next to the intermediate structure 108. A (e.g., tubular) radial outer surface 126 of the structure baffle 74 borders a (e.g., annular) feed cavity 128 in the cooling structure 70. More particularly, the baffle outer surface 126 forms a radial inner peripheral boundary of the feed cavity 128. The structure baffle 74 is thereby radially between and substantially separates the diffuser plenum 60 from the feed cavity 128.

Figure 4:
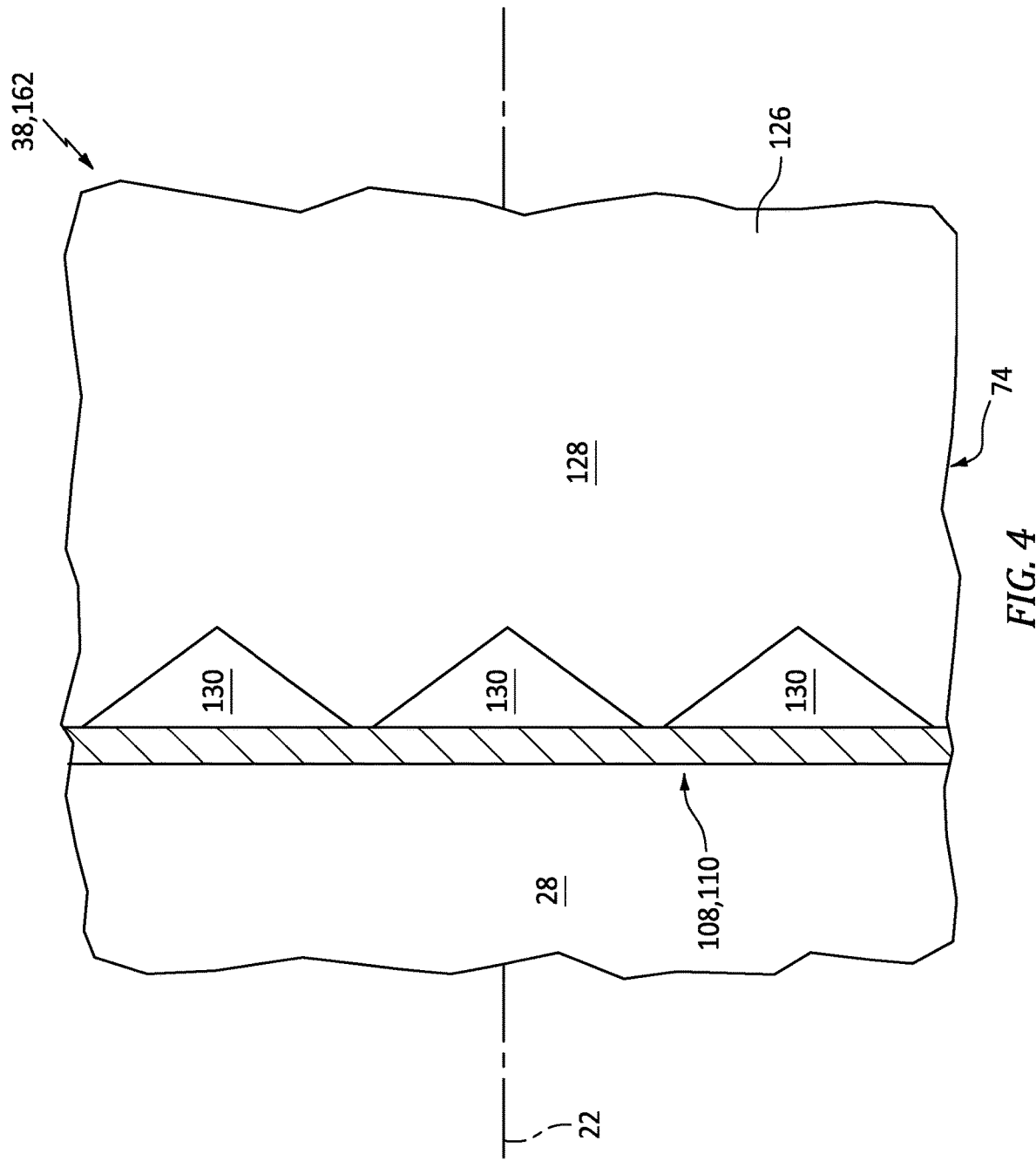
FIG. 4 is a sectional plan view illustration of the turbine engine at a cooling structure baffle.

The structure baffle 74 is configured with one or more ports 130. Referring to FIG. 4, the baffle ports 130 are arranged (e.g., and equispaced) circumferentially about the axis 22 in an array; e.g., a circular array. Referring to FIG. 3, the baffle ports 130 may be formed between the intermediate structure 108 and the structure baffle 74. Each baffle port 130 of FIG. 3, for example, projects axially into the structure baffle 74 from an intersection between the structure baffle 74 and the intermediate structure 108. Of course, it is contemplated one or more of the baffle ports 130 may alternatively be axially spaced from the intermediate structure 108 and fully formed in the structure baffle 74. Referring again to FIG. 3, each baffle port 130 extends radially though the structure baffle 74 from the diffuser plenum 60 and its inner portion to the feed cavity 128. The baffle ports 130 thereby fluidly couple the diffuser plenum 60 and its inner portion to the feed cavity 128.

The structure septum 76 is located radially between and is radially spaced from the turbine nozzle inner platform 86 and the structure baffle 74. The structure septum 76 is connected to (e.g., formed integral with) and axially between the structure endwall 72 and the intermediate structure 108. The structure septum 76 of FIG. 3, for example, extends axially forward from and may extend radially outward from the structure endwall 72 to the intermediate structure 108. The structure septum 76 extends circumferentially about (e.g., completely around) the axis 22 providing the structure septum 76 with, for example, a full-hoop (e.g., tubular) geometry. With this configuration, the structure septum 76 may axially and circumferentially overlap the turbine nozzle inner platform 86 and an upstream portion of the turbine wall 64 as well as the structure baffle 74. A (e.g., tubular) radial inner surface 132 of the structure septum 76 borders the feed cavity 128. More particularly, the septum inner surface 132 forms a radial outer peripheral boundary of the feed cavity 128. A (e.g., tubular) radial outer surface 134 of the structure septum 76 borders a (e.g., annular) cooling cavity 136 in the cooling structure 70. More particularly, the septum outer surface 134 forms a radial inner peripheral boundary of the cooling cavity 136. The structure septum 76 is thereby radially between and substantially separates the feed cavity 128 and the cooling cavity 136.

The structure septum 76 is configured with one or more cooling apertures 138A and 138B (generally referred to as "138"); e.g., impingement apertures. Each of these cooling apertures 138 extends radially through the structure septum 76 from the feed cavity 128 to the cooling cavity 136. The cooling apertures 138 thereby fluidly couple the feed cavity 128 to the cooling cavity 136.

Figure 5:
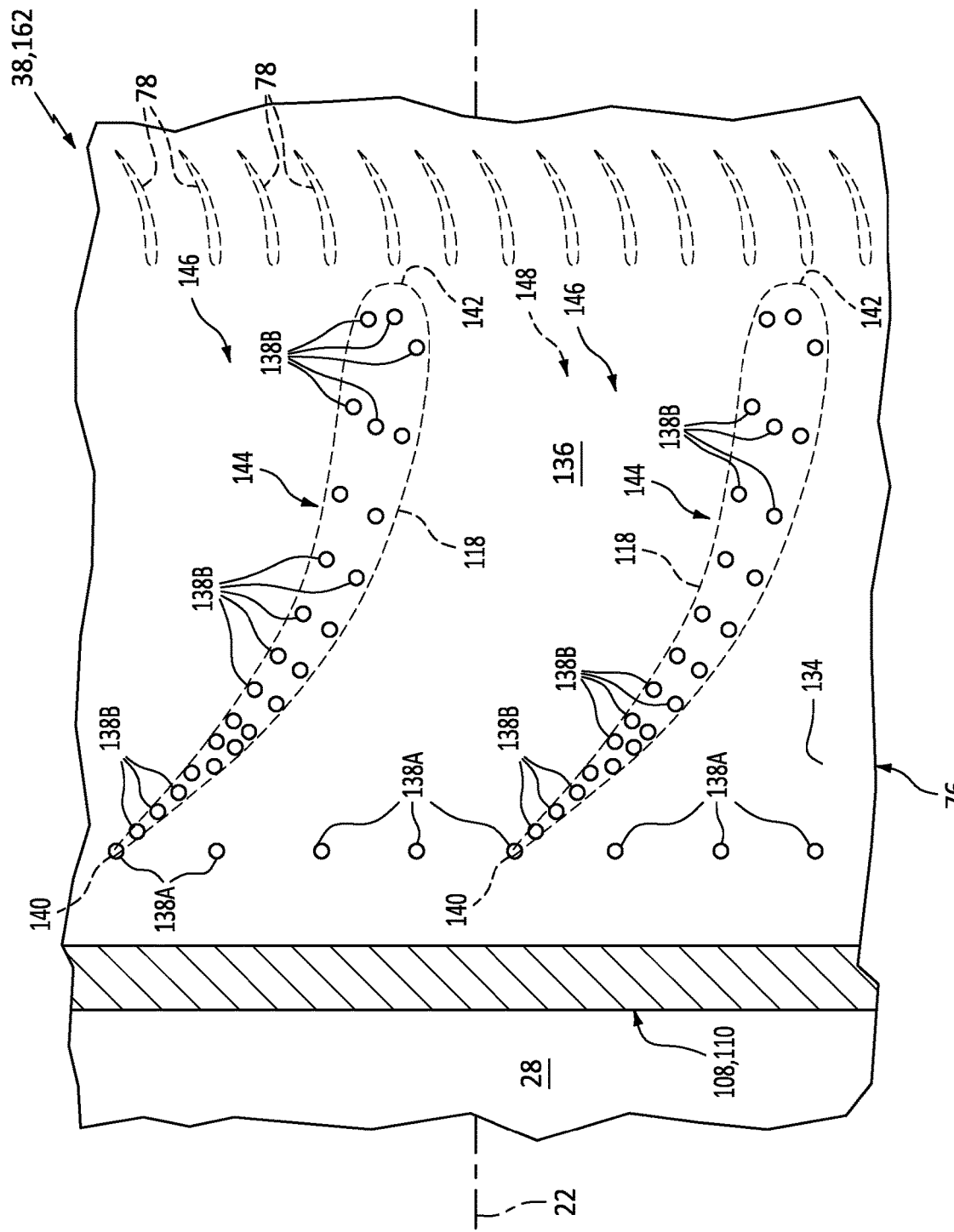
FIG. 5 is a sectional plan view illustration of the turbine engine at a cooling structure septum.

Referring to FIG. 5, the platform cooling apertures 138A may be arranged axially forward of the vane cooling apertures 138B along the cooling cavity 136. The platform cooling apertures 138A are arranged (e.g., and equispaced) circumferentially about the axis 22 in an array; e.g., a circular array. These platform cooling apertures 138A may be axially aligned with one another along the axis 22. The platform cooling aperture array and its platform cooling apertures 138A may be axially aligned with (or otherwise axially proximate to) trailing edges 140 of the turbine vanes 118. Briefly, each turbine vane 118 extends longitudinally along a mean line (e.g., a camber line) of the respective turbine vane 118 from a leading edge 142 of the respective turbine vane 118 to the trailing edge 140 of the respective turbine vane 118; see also FIG. 3.

The vane cooling apertures 138B are arranged into one or more sets 144. Each vane cooling aperture set 144 is associated with a respective one of the turbine vanes 118. The vane cooling apertures 138B in each set 144 of FIG. 5, for example, are axially and circumferentially aligned with a respective one of the turbine vanes 118. Here, the vane cooling apertures 138B in each set 144 are within and/or otherwise (e.g., partially or completely) overlap a footprint of the respective turbine vane 118. A density of the vane cooling apertures 138B in each set 144 may change as the respective turbine vane 118 extends longitudinally between its leading edge 142 and its trailing edge 140. For example, the density of the vane cooling apertures 138B in an area aligned with the respective turbine vane trailing edge 140 may be greater than the density of the vane cooling apertures 138B in an area aligned with the respective turbine vane leading edge 142. However, it is contemplated the density of the vane cooling apertures 138B may alternatively remain uniform (e.g., constant) as the respective turbine vane 118 extends longitudinally between its leading edge 142 and its trailing edge 140.

A section 146 of the structure septum 76 between each circumferentially neighboring pair of the vane cooling aperture sets 144 may be non-perforated; e.g., configured without any apertures extending therethrough. Each septum section 146 extends circumferentially between and to the respective circumferentially neighboring pair of the vane cooling aperture sets 144. Each septum section 146 axially overlaps at least a major portion (e.g., more than 50%, 70% or 90%) of an inter-vane channel 148. Each septum section 146 of FIG. 5, for example, extends axially along its neighboring vane cooling aperture sets 144 to the array of platform cooling apertures 138A. Briefly, each inter-vane channel 148 is formed by and extends radially between a respective circumferentially neighboring pair of the turbine vanes 118. Referring to FIG. 3, these inter-vane channels 148 may collectively form the core flowpath 28 in the turbine nozzle 68, at least longitudinally along the turbine vanes 118.

The feed cavity 128 may be collectively formed by the structure baffle 74, the structure septum 76, the intermediate structure 108 and the structure endwall 72. The feed cavity 128 of FIG. 3, for example, extends radially from the structure baffle 74 and its baffle outer surface 126 to the structure septum 76 and its septum inner surface 132. The feed cavity 128 extends axially from the intermediate structure 108 to the structure endwall 72. The feed cavity 128 extends circumferentially about (e.g., completely around) the axis 22. Here, the only inlet into the feed cavity 128 may be through the baffle ports 130 and/or the only outlet from the feed cavity 128 may be through the cooling apertures 138.

The cooling cavity 136 may be collectively formed by the structure septum 76, the turbine nozzle inner platform 86, the intermediate structure 108 and the structure endwall 72. The cooling cavity 136 of FIG. 3, for example, extends radially from the structure septum 76 and its septum outer surface 134 to the turbine nozzle inner platform 86. The cooling cavity 136 extends axially from the intermediate structure 108 to the structure endwall 72. The cooling cavity 136 extends circumferentially about (e.g., completely around) the axis 22. At the structure endwall 72, an annular outlet 150 from the cooling cavity 136 may project radially outwards to the combustion chamber 54 and, more generally, the core flowpath 28. This cooling cavity outlet 150 may be formed by and extends axially between the inner combustor wall 82 at its downstream end 88 and the turbine nozzle inner platform 86 at its upstream end 90. The cooling cavity outlet 150 fluidly couples the cooling cavity 136 to the combustion chamber 54 and, more generally, the core flowpath 28; e.g., upstream of the turbine nozzle 68 and its turbine nozzle inner platform 86 along the core flowpath 28. Here, the only inlet into the cooling cavity 136 may be through the cooling apertures 138A and 138B and/or the only outlet from the cooling cavity 136 may be through the cooling cavity outlet 150.

The cooling vanes 78 are arranged (e.g., and equispaced) circumferentially about the axis 22 in an array; e.g., a circular array. Each of these cooling vanes 78 is connected to (e.g., formed integral with) the turbine nozzle 68 and its turbine nozzle inner platform 86. Each of the cooling vanes 78 projects radially out from the turbine nozzle inner platform 86 (in a radial inward direction towards the axis 22) into the cooling cavity 136 to a radial inner distal end 152 of the respective cooling vane 78. More particularly, each cooling vane 78 projects out from the turbine nozzle inner platform 86 along a span line of the respective cooling vane 78 to its distal vane end 152. This distal vane end 152 of FIG. 3 is (e.g., completely) radially spaced from the structure septum 76 by a gap; e.g., an air gap, an open volume, etc. Each cooling vane 78 may thereby be cantilevered from the turbine nozzle inner platform 86, where the distal vane end 152 of each cooling vane 78 may be structurally unsupported. With this arrangement, each cooling vane 78 may extend substantially radially across the cooling cavity 136 towards the structure septum 76 and its outer surface 134.

The cooling vanes 78 are located between some or all of the cooling apertures 138 and the cooling cavity outlet 150. The cooling vanes 78 may also or alternatively be axially offset from the turbine vanes 118; e.g., the cooling vane array may not axially overlap the turbine vane array. The cooling vanes 78 of FIG. 3, for example, are disposed approximately at or near the cooling cavity outlet 150. More particularly, the cooling vanes 78 of FIG. 3 are disposed at (or may be slightly spaced forward from) the inner platform upstream end 90. With this arrangement, the cooling vanes 78 may be configured to condition (e.g., impart swirl to) cooling air directed out of the cooling cavity 136 into the core flowpath 28 and its combustion chamber 54.

During turbine engine operation, some of the compressed core air (e.g., cooling air) is directed from the diffuser plenum 60 through the ports 130 into the feed cavity 128. The cooling apertures 138 direct the cooling air from the feed cavity 128 into the cooling cavity 136. Each cooling aperture 138, for example, directs a stream (e.g., a jet) of the cooling air received from the feed cavity 128 across the cooling cavity 136 to impinge against the turbine nozzle inner platform 86. The stream of cooling air may also or alternatively coalesce with other streams of the cooling air to form a blanket of cooling air. This blanket of cooling air may flow along/wash over the inner surface of the turbine nozzle inner platform 86 to film cool the turbine nozzle inner platform 86. Such impingement cooling and/or film cooling of the turbine nozzle inner platform 86 may facilitate cooling of the turbine vanes 118 by drawing heat energy out of the turbine vanes 118 into the turbine nozzle inner platform 86 for convection into the cooling air. Additional heat energy may also be drawn out of the turbine vanes 118 through the turbine nozzle inner platform 86 and into the cooling vanes 78 for additional convection into the cooling air. The cooling structure 70 is thereby operable to cool the turbine nozzle 68 and its turbine vanes 118 during turbine engine operation. Cooling the turbine nozzle 68 and its turbine vanes 118 reduces an operating temperature of the turbine vanes 118, which may reduce thermal erosion and/or degradation of the turbine vanes 118.

Figure 6:
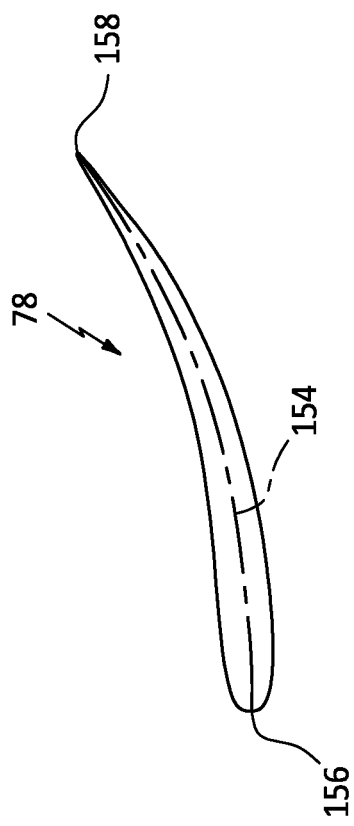
FIGS. 6 and 7 are plan view illustrations of various cooling vane arrangements.
Figure 7:
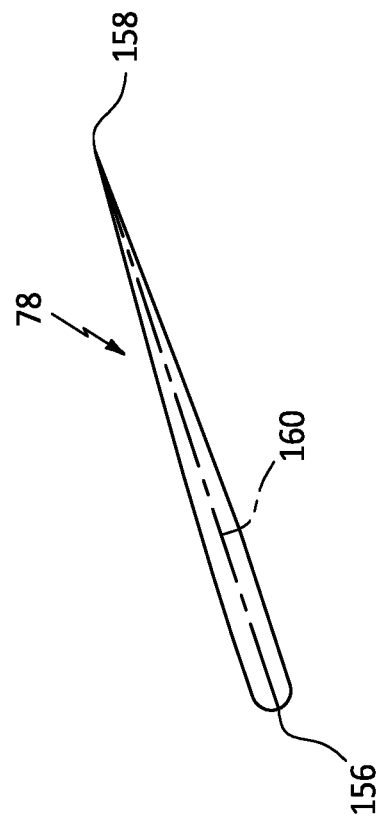

In some embodiments, referring to FIG. 6, each cooling vane 78 may be configured as a cambered cooling vane. Each cooling vane 78, for example, may extend longitudinally along a curved mean line—a camber line 154—of the respective cooling vane 78 between a leading edge 156 of the respective cooling vane 78 and a trailing edge 158 of the respective cooling vane 78. In other embodiments, referring to FIG. 7, one, some or all of the cooling vanes 78 may alternatively extend longitudinally along a straight mean line—a chord line 160—of the respective cooling vane 78 between its leading edge 156 and its trailing edge 158.

In some embodiments, referring to FIG. 5, the turbine nozzle 68 and its turbine vanes 118 may be configured to swirl the combustion products in a first circumferential direction about the axis 22. The cooling structure 70 and its cooling vane 78 may also be configured to swirl the cooling air in the first circumferential direction about the axis 22.

Figure 8:
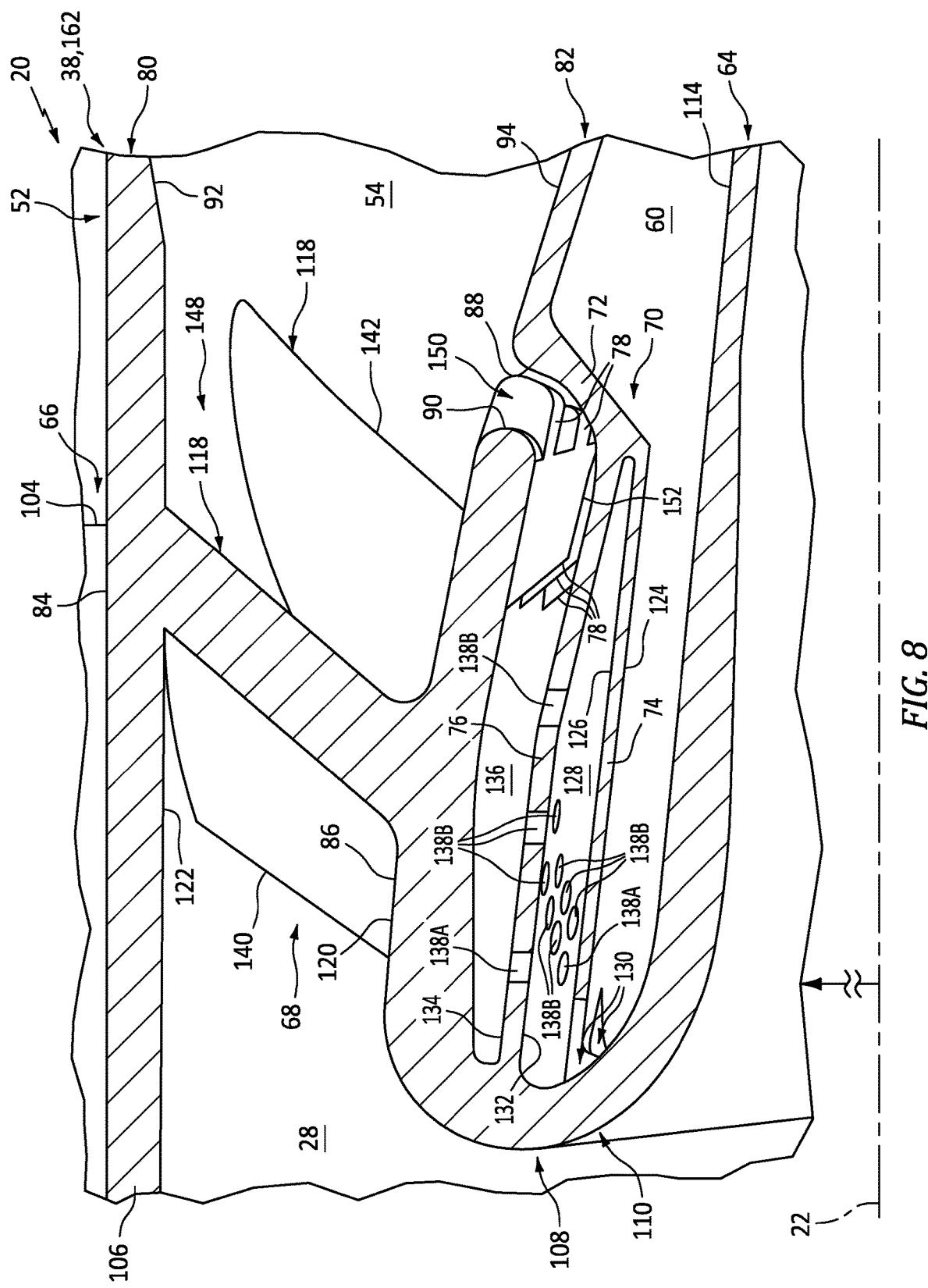
FIG. 8 is a perspective cutaway illustration of a portion of the turbine engine with another cooling structure.

In some embodiments, referring to FIG. 3, one, some or all of the cooling vanes 78 may each project radially into the cooling cavity 136. In other embodiments, referring to FIG. 8, one, some or all of the cooling vanes 78 may alternatively (or also) project axially into the cooling cavity 136 and/or its cooling cavity outlet 150.

Referring to FIG. 2, at least a portion (or an entirety) of the stationary structure 38 may be formed as a monolithic body 162; see also FIG. 1. At least the stationary structure members 52, 62, 64, 66, 68 and 70 of FIG. 2, for example, are included in the monolithic body 162. Herein, the term "monolithic" may describe an apparatus which is formed as a single, unitary body. The stationary structure members 52, 62, 64, 66, 68 and 70, for example, may be additively manufactured, cast, machined and/or otherwise formed together as an integral, unitary body. By contrast, a non-monolithic body may include multiple parts which are discretely formed from one another, where those parts are subsequently mechanically fastened and/or otherwise attached to one another.

The turbine engine 20 is described above as a single spool, radial-flow turbojet gas turbine engine for case of description. The present disclosure, however, is not limited to such an exemplary turbine engine. The turbine engine 20, for example, may alternatively be configured as an axial flow gas turbine engine. The turbine engine 20 may be configured as a direct drive gas turbine engine. The turbine engine 20 may alternatively include a geartrain that connects one or more rotors together such that the rotors rotate at different speeds. The turbine engine 20 may be configured with a single spool (e.g., see FIG. 1), two spools, or with more than two spools. The turbine engine 20 may be configured as a turbofan engine, a turbojet engine, a propfan engine, a pusher fan engine or any other type of turbine engine. In addition, while the turbine engine 20 is described above with an exemplary reverse flow annular combustor, the turbine engine 20 may also or alternatively include any other type/configuration of annular, tubular (e.g., CAN), axial flow and/or reverse flow combustor. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a nozzle structure including a first platform, a second platform and a plurality of nozzle vanes arranged circumferentially about an axis, the first platform forming a first boundary of a flowpath through the nozzle structure, the second platform forming a second boundary of the flowpath, and the plurality of nozzle vanes extending radially across the flowpath from the first platform to the second platform;
a septum axially and circumferentially overlapping the first platform with a cooling cavity formed by and radially between the septum and the first platform, the septum comprising a plurality of cooling apertures aligned with the plurality of nozzle vanes, each of the plurality of cooling apertures extending radially through the septum to the cooling cavity, and the cooling cavity comprising a cavity outlet fluidly coupled to the flowpath; and
a plurality of cooling vanes arranged circumferentially about the axis and projecting from the first platform into the cooling cavity, the plurality of cooling vanes located between the plurality of cooling apertures and the cavity outlet along the cooling cavity.

2. The assembly of claim 1, wherein the cavity outlet is located upstream of the first platform along the flowpath.

3. The assembly of claim 1, wherein each of the plurality of cooling apertures is configured to direct a stream of air across the cooling cavity against the first platform.

4. The assembly of claim 1, wherein the plurality of cooling apertures are axially aligned along the axis and arranged circumferentially about the axis in an annular array.

5. The assembly of claim 1, wherein
the plurality of nozzle vanes comprise a first nozzle vane; and
the plurality of cooling apertures comprises a first cooling aperture, and the first cooling aperture is axially and circumferentially aligned with the first nozzle vane.

6. The assembly of claim 1, wherein
the plurality of nozzle vanes include a first nozzle vane and a second nozzle vane that circumferentially neighbors the first nozzle vane with a channel formed by and extending circumferentially between the first nozzle vane and the second nozzle vane;
a first set of the plurality of cooling apertures are axially and circumferentially aligned with the first nozzle vane;
a second set of the plurality of cooling apertures are axially and circumferentially aligned with the second nozzle vane; and
a section of the septum is non-perforated, the section of the septum extends circumferentially between the first set of the plurality of cooling apertures and the second set of the plurality of cooling apertures, and the section of septum axially overlaps at least a major portion of the channel.

7. The assembly of claim 1, wherein
the plurality of nozzle vanes comprise a first nozzle vane, and the first nozzle vane extends longitudinally between a leading edge and a trailing edge; and
a first set of the plurality of cooling apertures are axially and circumferentially aligned with the first nozzle vane, and a density of cooling apertures in the first set of the plurality of cooling apertures is greater in an area aligned with the trailing edge than in an area aligned with the leading edge.

8. The assembly of claim 1, wherein
the plurality of cooling vanes comprise a first cooling vane; and
the first cooling vane projects radially and/or axially from the first platform to an unsupported distal end of the first cooling vane.

9. The assembly of claim 1, wherein the plurality of cooling vanes are axially offset from the plurality of nozzle vanes.

10. The assembly of claim 1, wherein
the plurality of cooling vanes comprise a first cooling vane; and
the first cooling vane comprises a cambered cooling vane.

11. The assembly of claim 1, wherein
the plurality of nozzle vanes are configured to swirl combustion products in a circumferential direction about the axis; and
the plurality of cooling vanes are configured to swirl air in the circumferential direction about the axis.

12. The assembly of claim 1, further comprising:
a baffle axially and circumferentially overlapping the septum with a feed cavity formed by and radially between the baffle and the septum; and
the septum radially between the baffle and the first platform with the plurality of cooling apertures fluidly coupling the feed cavity to the cooling cavity.

13. The assembly of claim 12, further comprising:
a turbine wall; and
an intermediate structure extending between a downstream end of the first platform and an upstream end of the turbine wall;
the septum extending axially to the intermediate structure; and
the baffle extending axially to the intermediate structure with one or more ports formed through the baffle adjacent the intermediate structure.

14. The assembly of claim 1, further comprising:
a combustor wall radially between and bordering a plenum and a combustion chamber;
a downstream end of the combustor wall axially spaced from an upstream end of the first platform to form the cavity outlet.

15. The assembly of claim 1, further comprising:
a combustor disposed in a plenum and comprising a combustion chamber;
the nozzle structure arranged at an outlet from the combustion chamber; and
the plurality of cooling aperture configured to receive air from the plenum to direct across the cooling cavity onto the first platform.

16. The assembly of claim 1, further comprising a monolithic body that includes the nozzle structure, the septum and the plurality of cooling vanes.

17. The assembly of claim 1, wherein
the first platform is an inner platform which circumscribes the septum and the plurality of cooling vanes; and the second platform is an outer platform which circumscribes the inner platform.

\* \* \* \* \*